United States Patent [19]

Totsuka et al.

[11] Patent Number: 5,457,448
[45] Date of Patent: Oct. 10, 1995

[54] SELF-STANDING MINI REMOTE COMMANDER

[75] Inventors: Keiichi Totsuka, Weehawken; Richard Gioscia, Mahwah, both of N.J.

[73] Assignee: Sony Electronics, Inc., Park Ridge, N.J.

[21] Appl. No.: 101,007

[22] Filed: Aug. 3, 1993

[51] Int. Cl.⁶ ............................... H04Q 7/00; H04B 1/03
[52] U.S. Cl. ...................... 340/825.72; 455/90; 446/326; 348/734; 341/176
[58] Field of Search ............................. 455/89, 90, 128; 348/734; 341/176; 340/825.72, 825.69, 825.76; 379/454; 446/326, 396, 325

[56] References Cited

U.S. PATENT DOCUMENTS

| | | | |
|---|---|---|---|
| 952,862 | 3/1910 | Armstrong | 446/325 |
| 2,937,872 | 5/1960 | Gilman | 446/396 |
| 3,323,798 | 2/1964 | Miller | 446/396 |
| 3,548,311 | 12/1970 | Burns | 455/128 |
| 4,482,947 | 11/1984 | Zato et al. | 340/825.76 |
| 4,626,847 | 12/1986 | Zato | 348/734 |
| 4,825,200 | 4/1989 | Evans et al. | 340/825.72 |
| 4,999,622 | 3/1991 | Amano et al. | 340/825.72 |
| 5,159,706 | 10/1992 | Hodsdon | 455/90 |
| 5,181,024 | 1/1993 | Tsunoda et al. | 340/825.72 |
| 5,214,422 | 5/1993 | Callimore | 340/825.72 |
| 5,335,261 | 8/1994 | Fujinaka | 455/89 |

Primary Examiner—Donald J. Yusko
Assistant Examiner—Edward Merz
Attorney, Agent, or Firm—Jay H. Masoli

[57] ABSTRACT

A remote control unit for a television or video tape recorder has a minimal number of keys to simplify use of the control unit. The unit is shaped having a rounded bottom and is weighted toward that bottom, so that the remote control unit will stand upright even if momentarily tipped over. The remote control unit includes a programmable read-only memory, so that it can control various units such as a television, video tape recorder, compact audio disc player, and the like. The rounded bottom is attached to the main body of the remote control unit in a rotary fashion so that the bottom may be rotated to select different functions, such as the television or video tape recorder to be controlled.

12 Claims, 3 Drawing Sheets

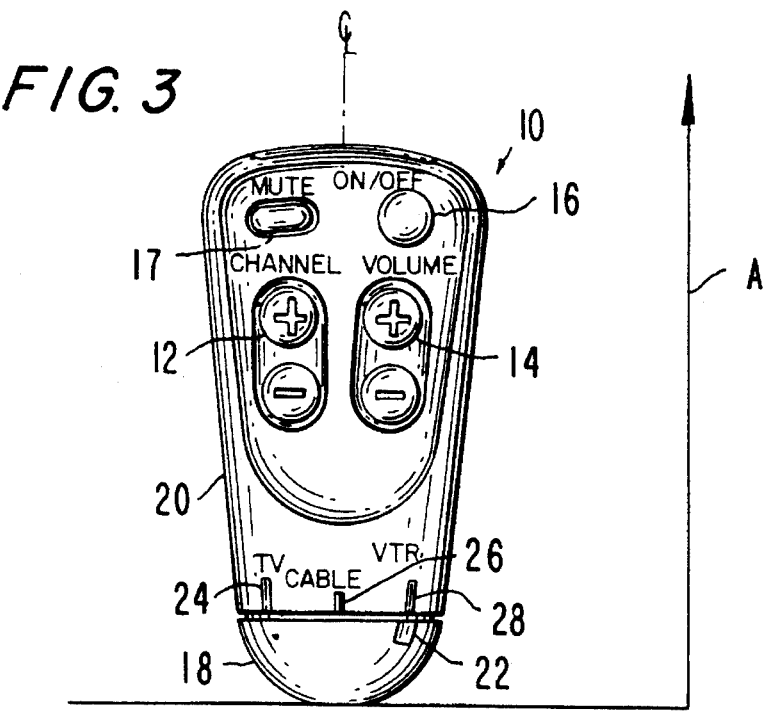
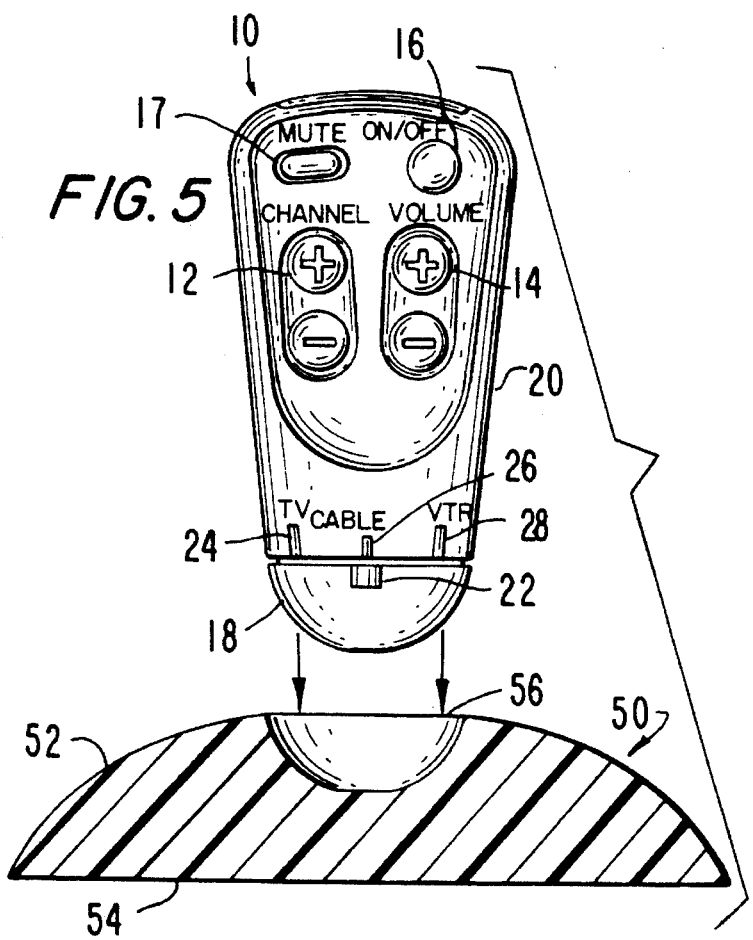

5,457,448

SELF-STANDING MINI REMOTE COMMANDER

BACKGROUND OF THE INVENTION

1. Field of the Invention

This invention relates generally to a remote control unit and, more particularly, to a self-standing remote control unit that has a weighted, rounded bottom, which bottom is rotatable and serves as a function switch as well.

2. Description of the Background

Remote control units are quite familiar to those who purchase modern televisions and videotape recorders. The trend in such remote control units is to include more and more controls that can permit the user to control virtually every facet of the electronic device. Some remote control units even have flip-panels that conceal still more controls. Needless to say, the result is that the remote control units tend to be relatively large and cumbersome. On the other hand, much smaller remote control units are provided, sometimes as small as a credit card, that have proportionally fewer controls. While sometimes convenient, these very small remote control units tend to be misplaced and do not readily come to hand when needed.

These previously known remote control units then either suffer from the large-sized overly complex drawback or, on the other hand, from such a small size that they tend to be misplaced and are not always available for use when needed.

OBJECTS AND SUMMARY OF THE INVENTION

Accordingly, it is an object of the present invention to provide a remote control unit for a television or video tape recorder that can eliminate the above-noted defects inherent in the prior art.

Another object of this invention is to provide a remote control unit that has a weighted, rounded bottom so that it resides in an upright position, even if momentarily tipped over.

A further object of this invention is to provide a remote control unit that has a minimal number of control buttons or keys to simplify use of the remote control unit.

A still further object of the present invention is to provide the rounded bottom of the remote control unit to be the control element of a rotary function switch that permits the user to select the function or the device to be controlled.

In accordance with an aspect of the present invention, a remote control unit for controlling various kinds of electronic apparatus, such as a television set, a video tape recorder, or cable system, is in the form of a hand-sized unit that has a weighted, rounded bottom so that the unit can be set or placed on a surface in any orientation and still generally reside in an upright position. The remote control unit has a minimal number of keys, such as channel increment up/down and volume increment up/down as well as an on/off switch to control the on/off operation of the device being controlled. The rounded bottom of the remote control unit serves as a function switch and is connected to a rotary switch that can control the central processing unit included in the remote control unit. The central processing unit in the remote control unit is connected to a programmable read-only memory that contains the appropriate commands for controlling the various units to be controlled, as selected by the rotary function switch. Accordingly, once the function is selected and one of the buttons pressed, an infrared radiation control signal is transmitted from the remote control unit to the apparatus being controlled.

The above and other objects, features, and advantages of the present invention will become apparent from the following detailed description of illustrative embodiments thereof to be read in conjunction with the accompanying drawings in which like numerals represent the same or similar elements.

BRIEF DESCRIPTION OF THE DRAWINGS

FIG. 3 is an elevational view of the remote control unit according to the present invention showing the rotary base being twisted to select a different control function;

FIG. 5 is an elevational view of the remote control unit according to the present invention shown being inserted into a stand.

DETAILED DESCRIPTION OF THE PREFERRED EMBODIMENT

Figure 1:
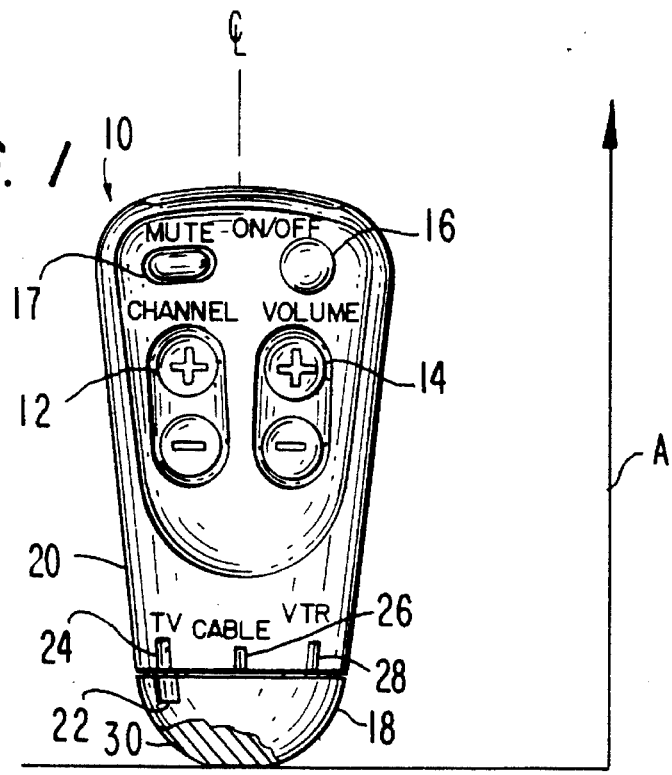
FIG. 1 is an elevational view showing the remote control unit according to the present invention in an upright position.

FIG. 1 shows the remote control unit 10 of the present invention in an upright position relative to the vertical as represented by axis A. The remote control unit 10 includes a pair of channel up/down switches 12 and a pair of volume increment switches 14. It has been determined that these two operations are those most typically employed when using a remote control unit. In addition, an on/off button 16 is provided to turn the apparatus under control either on or off and a mute switch 17 is also provided. As will be seen from the following, the commands are transmitted by the remote commander 10 to the apparatus under control using infrared radiation in the well-known fashion. The remote control unit 10 includes a rounded, spheroid base portion 18 that is connected to the body 20 of the remote control unit in such a fashion so that the base 18 can rotate relative to the body 20. The rotation of the base element serves as the rotary function switch, so that by rotating the base 18 the remote control unit can be selected to control a video tape recorder or a television or a cable unit. The base 18 has an indicator mark 22 and the body 20 has indicia, such as 24 for a TV, 26 for cable, and 28 for a VTR.

A feature of the present invention is the convenience provided by having a remote control unit being readily available and easily noticeable by remaining in the upright position, as shown in FIG. 1. By providing a weighted, rounded base portion the present invention permits the remote control unit to be set down at an angle, that is, not balanced in the upright position, yet the weighted, rounded bottom will cause the remote control unit to reside in the upright position. A portion of the rounded bottom 18 is shown broken away so that the weight or weighted material 30 residing therein can be seen in cross section.

Figure 2:
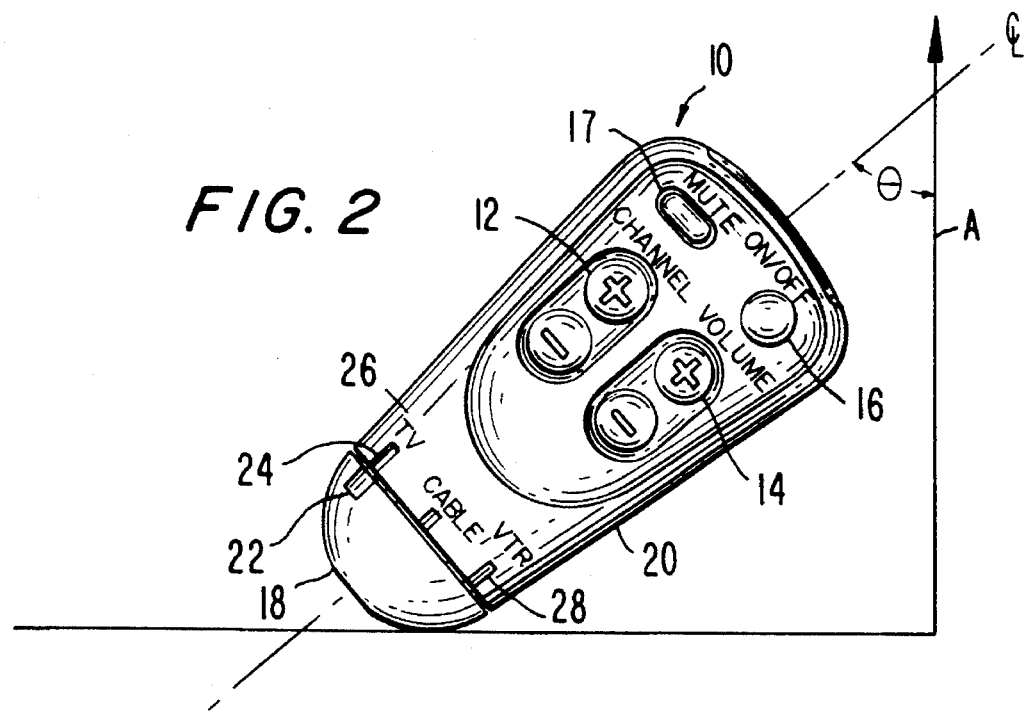
FIG. 2 is an elevational view of the remote control unit of FIG. 1 in a tilted or off-vertical position.

FIG. 2 represents the remote control unit 10 after having just been placed on a surface 22 at an angle Θ relative to the vertical axis A. Upon releasing the remote control unit 10 in the position of FIG. 2, the unit 10 will move to resume the upright position, such as shown in FIG. 1. The angle Θ shown in FIG. 2 is approximately 45°. Nevertheless, a greater angle could be possible and because of this weight and shape, even if the unit is laid flat on its side, it will assume the upright position.

The base 18 having the spheroid shape is attached to the main body 20 of the remote control unit 10 in such a fashion that it can rotate relative thereto and that rotation is used to select the function, that is, the device to be controlled. FIG. 3 shows the base element 18 rotated from its position as shown in FIGS. 1 and 2 in which the television function was selected, to the VTR or video cassette recorder function. Of course, more than three functions are possible and are limited only by the computing power available in the electronics in the remote control unit.

Figure 4:
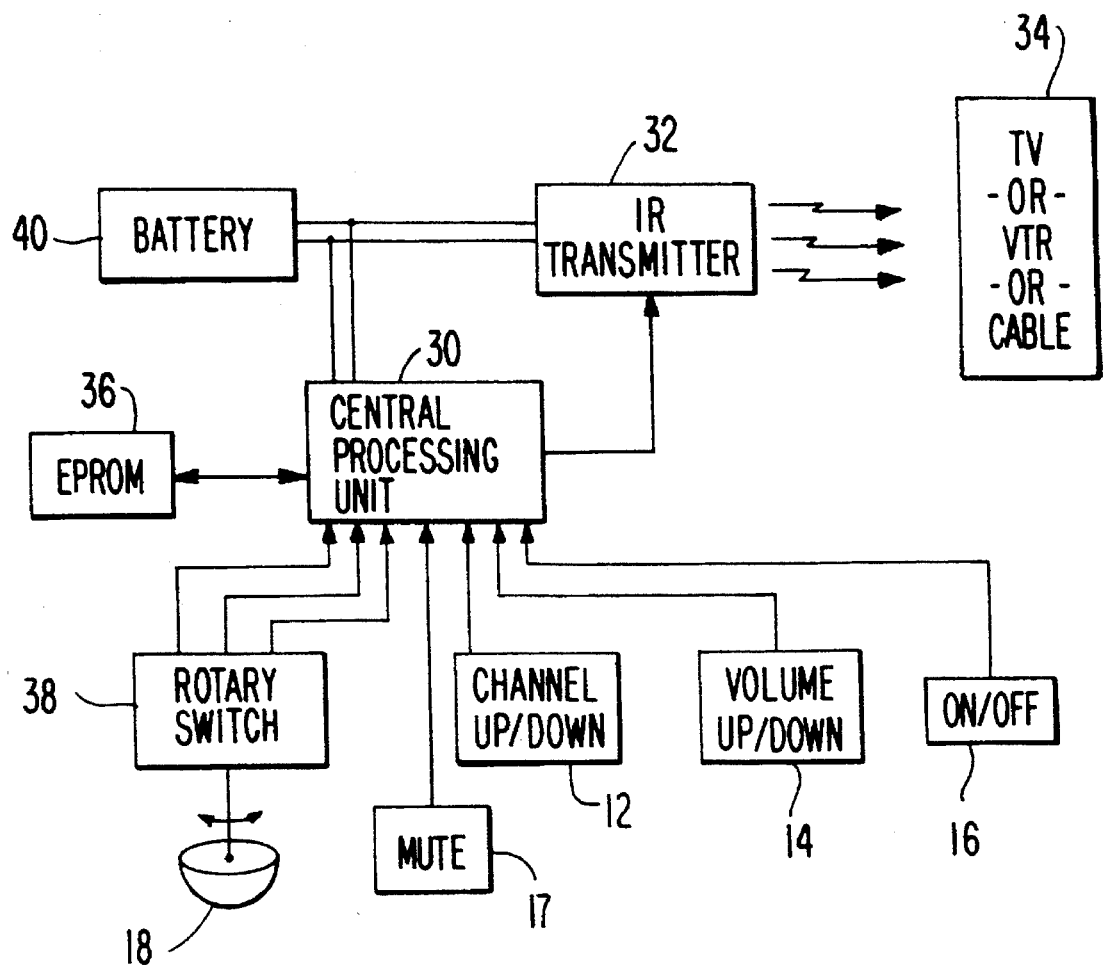
FIG. 4 is a schematic in block diagram form of the remote control unit according to an embodiment of the present invention.

In that regard, FIG. 4 shows an embodiment of the operable elements of the remote control unit in block diagram form. More specifically, a central processing unit 30 is provided to generate the appropriate command signal formats for the commands, as selected by the user of the remote control unit. Such commands are then transmitted by an infrared transmitter 32 in the conventional fashion to the device being controlled, represented generally at 34. Because the present invention permits different functions, that is, different devices to be controlled, a programmable read-only memory 36 is provided and connected to the central processing unit. This read-only memory 36 may be an erasable programmable read-only memory (EPROM), so that the remote control unit can be completely changed so as to control various other kinds of electronic equipment that may not presently even be commercially available. In any event, the read-only memory 36 will contain the individual command protocols for various kinds of units, such as cable, television, or video cassette recorder. These functions are selected by rotating function knob 18 that controls a rotary switch 38 whose outputs are connected to the central processing unit 30. Similarly, the channel up/down switches 12, the volume up/down switches 14, and the on/off switch 16 are all connected to the central processing unit 30 that issues the commands to the infrared ray transmitter 32. The entire remote control unit is powered by a battery 40 in the well-known fashion.

Although the provision of the rounded bottom is intended to permit the unit to remain upright regardless of its being set down off the vertical axis, a base element 50 shown in FIG. 5 can be employed. The base 50 is shown in cross-section in FIG. 5 and has a generally rounded upper surface 52 and a flat bottom surface 54 with a central aperture 56 being sized to receive the rounded bottom 18.

The above description is based on preferred embodiments of the present invention, however, it will apparent that modifications and variations thereof could be effected by one with skill in the art without departing from the spirit or scope of the invention, which is to be determined by the following claims.

What is claimed is:

1. A remote control unit for transmitting command signals to a selected one of a plurality of electronic apparatuses to be controlled, the control unit comprising:

a main body element being of a size to fit in a hand of a user;

a base element rotatably attached to a bottom of said main body element and having a semi-spheroid shape for supporting the remote control unit when the remote control unit is on a surface;

a rotary switch arranged within said main body and being connected to and operated by said base element, wherein switch positions of said rotary switch represent functions of the selected electronic apparatus;

command switches for actuation by the user for selecting operations of the selected electronic apparatus;

a central processing unit connected to said rotary switch and to said command switches for producing output control signals; and an infrared ray transmitter arranged within said main body and connected to receive said output control signals for producing command signals transmitted to the selected electronic apparatus.

2. A remote control unit according to claim 1, further comprising a weight element arranged within said base element so as to render said base element heavier than said main body element.

3. A remote control unit according to claim 1, further comprising a read-only memory arranged within said main body element and connected to said central processing unit, said read-only memory containing operational command protocols corresponding to said functions of the selected electronic apparatus selected by said rotary switch.

4. A remote control unit according to claim 1, further comprising a stand having a flat bottom surface and a centrally arranged aperture on an upper surface for receiving therein said base element.

5. A remote control unit according to claim 1, wherein said command switches include an on/off switch, channel increment up/down switches, and volume increase/decrease switches.

6. A remote control unit for use in controlling a selected one of a plurality of electronic apparatuses, comprising:

an elongate shape main body element being of a size to be held in one hand of a user;

a base element rotatably attached to one end of said elongate shape main body element and having a semi-spheroid rounded shape for supporting the remote control unit when the remote control unit is on a surface;

a weight formed inside said base element, so that said base element weighs more than said main body element; and a rotary switch arranged within said main body element and being connected for operation by rotation of said base element relative to said main body element, wherein switch positions of said rotary switch represent functions of the selected electronic apparatus.

7. A remote control unit according to claim 6, further comprising command switches attached to said main body element for actuation by the user for selecting operations of the selected electronic apparatus.

8. A remote control unit according to claim 7, further comprising a central processing unit connected to said rotary switch and to said command switches for producing output control signals for controlling the selected electronic apparatus.

9. A remote control unit according to claim 8, further comprising an infrared ray transmitter arranged within said main body element and connected to receive said output control signals for producing command signals transmitted to the selected electronic apparatus.

10. A remote control unit according to claim 9, further comprising a read-only memory arranged within said main body element and connected to said central processing unit, said read-only memory containing operational command protocols corresponding to said functions of the selected electronic apparatus selected by said rotary switch.

11. A remote control unit according to claim 10, further comprising a stand having a flat bottom surface and a centrally arranged aperture on an upper surface for receiving therein said base element.

12. A remote control unit according to claim 11, wherein said command switches include an on/off switch, channel increment up/down switches, and volume increase/decrease switches.

* * * * *